Sept. 3, 1935. N. P. HARSHBERGER Re. 19,689

SHINGLE MACHINE

Original Filed Jan. 16, 1929

INVENTOR:
Norman P. Harshberger
By E. J. Andrews
Att'y.

Reissued Sept. 3, 1935

Re. 19,689

UNITED STATES PATENT OFFICE 19,689

SHINGLE MACHINE

Norman P. Harshberger, Scarsdale, N. Y., assignor to Bakelite Building Products, Inc., New York, N. Y., a corporation of Delaware Original No. 1,894,037, dated January 10, 1933, Serial No. 332,913, January 16, 1929. Application for reissue January 9, 1935, Serial No. 1,079

8 Claims. (Cl. 164—28)

Figure 1:
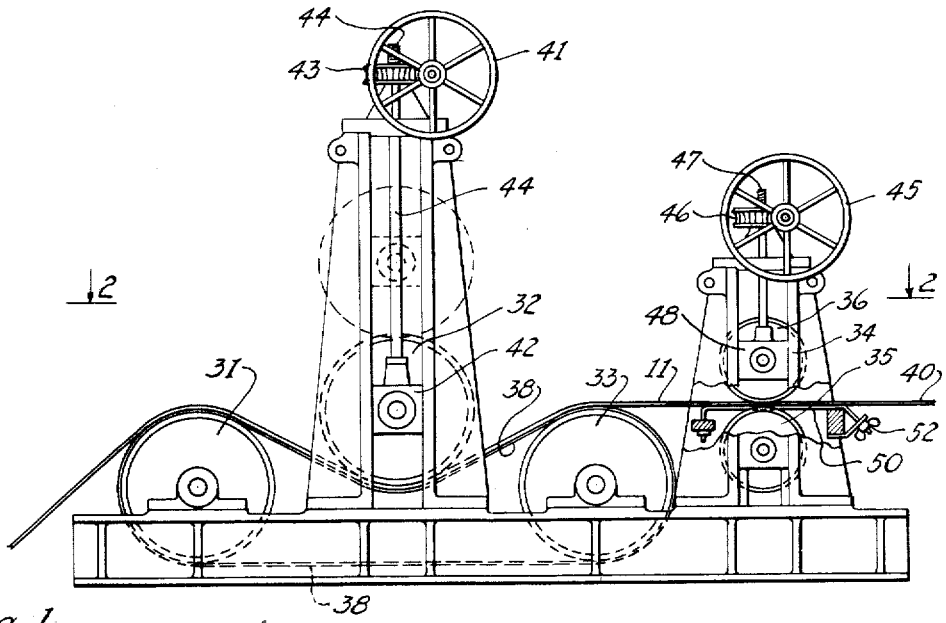

This invention relates to methods of preparing shingle material and forming shingles therefrom and providing apparatus therefor. The general object is to provide a machine for cutting the webs of shingle material into shingles of any desirable shape. Special objects of the invention will be apparent from a consideration of the drawing and the following description thereof.

Figure 2:
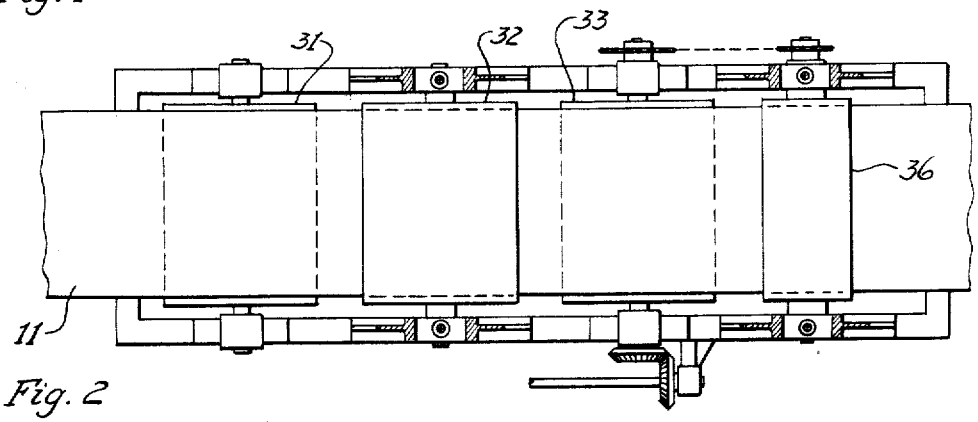
Figure 3:
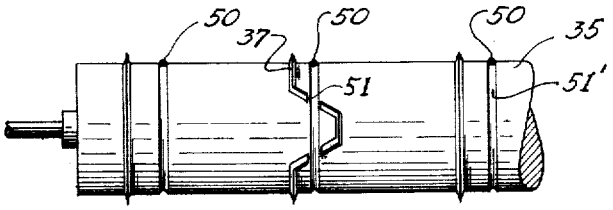

Of the drawing, Fig. 1 is an elevation of the machine for cutting the shingles; Fig. 2 is a sectional plan view of the shingle cutting machine along the line 2—2 of Fig. 1; and Fig. 3 is an enlarged plan view of a portion of a cutting roller of the machine.

As is well understood, ordinary asphalt shingles are made by impregnating sheets of suitable material, such as felt, with asphalt or some other suitable material, and, while the asphalt is soft, by sprinkling on the surface of the sheet suitable granulated mineral such as slate. The sheet of prepared material is then dried until the asphalt hardens sufficiently, and the webs thus formed are then ordinarily rolled into rolls for transportation or other use. The webs are then passed through suitable machines for cutting them into individual or strip shingles.

The web is passed over a roller 31, under a roller 32, and over a roller 33. Around these rollers 31, 32 and 33 plays a belt or belts 38 against which the web is pressed by the adjustable roller 32. These rollers are so positioned and arranged as to hold the web substantially taut, and, together with the belt 38, to pull the web and to push it forward towards the cutting portion of the machine. The belt 38 not only assists in carrying the web forwardly, but it also supports the web so that danger of rupture or distortion is eliminated.

This cutting portion comprises a framework 34 in which is journaled a cutting roller 35. The upper surface of this roller is substantially of the same elevation as the upper surface of the feeding roller 33, so that the web 11 is fed horizontally across the top of the cutting roller. A second roller 36 is mounted for vertical movement and is adapted to be so positioned as to press down on the web 11, as it passes over the cutter roller, sufficiently to cause the knives 37 mounted on the surface of the cutter roller to cut the web into shingles.

The knives 37 mounted on the cutter roller 35 are arranged and shaped so as to cut out shingles of the form desired. After being cut, the shingles 40 are passed out of the machine and removed in any suitable manner. The cutting mechanism may be operated in any suitable manner.

The roller 32 is mounted for vertical movement and may be elevated or lowered by means of a hand wheel 41 or in any suitable manner. I prefer to have the hand wheel connected to the bearing 42 of the roller by means of a worm wheel 43 which is threaded on to a shaft 44 connected with the bearing 42 and suitably held from vertical displacement as to raise or lower, as it turns in response to the rotation of a worm fixed to the wheel 41, the shaft 44 and thus the roller 32. If it is desired to remove the web, or when the web is entered into the machine, the roller 32 may be elevated and the web 11 passed freely into the cutting rollers.

The roller 36 may be elevated and lowered in a similar manner by means of a hand wheel 45 which is arranged to operate the worm wheel 46 threaded on to the shaft 47 which is fixed to the bearing 48 of the roller 36.

As will be understood, when the shingles are cut from these webs of pliable material, there is a tendency for the shingles to be carried around on the surface of the cutting roller 35 between the knives. In order to strip the shingles from the surface of this roller, any suitable means may be provided. I prefer to provide for the purpose the wires or rods 50 which pass between the webs 11 and the surface of the roller 35, passing through openings 51 in the knives, and, preferably, along grooves 51′ in the surface of the roller. These rods are supported in any suitable manner. I prefer to support them by their ends on each side of the cutting roller, and by means of a nut 52 threaded on one end of each of the rods, the rods may be sufficiently tightened for the purpose.

It is to be understood that these strippers will strip from the cutting rollers not only the complete shingle but also any waste pieces that may be cut out by the knives.

I claim as my invention:

1. In a shingle making machine, a cutting roller having knives provided with cutting edges, means for stripping cut shingles from said roller, said means comprising elongated members running across a portion of the periphery of the roller, and means for tensioning said elongated members, the cutting edges of the knives projecting beyond the periphery of the roller a greater distance than the elongated members.

2. In a shingle making machine, a cutting roller having knives provided with cutting edges, means for stripping cut shingles from said roller, said means comprising elongated members running across the upper portion of the periphery of said roller, said roller having circumferential grooves therein, and said elongated members running horizontally in said grooves, and means for tensioning said elongated members, the cutting edges of the knives projecting beyond the periphery of the roller a greater distance than the elongated members.

3. In a single making machine, a cutting roller having knives provided with cutting edges, means for stripping cut pieces of shingle material from said roller, said means comprising rods running along the periphery of said roller, and means for tensioning said rods the cutting edges of the knives projecting beyond the periphery of the roller a greater distance than said rods.

4. In a shingle making machine, a cutting roller, a movably mounted endless belt for feeding strips of shingle material to said cutting roller, means for pressing said strips against said belt, said means positioned to obtain with said belt a substantial area of grip upon the shingle strips, worm and worm wheel means for positively adjusting said pressing means relative to said endless belt, and means for stripping cut pieces of shingle material from said cutting roller.

5. In a shingle making machine, a cutting roller, a movably mounted endless belt for supporting and feeding shingle strips to said cutting roller, adjustable roller means for pressing said shingle strips against said belt and for deflecting the belt below its normal plane of travel to obtain therefore a substantially positive grip on the material, said means also adjustable for different thicknesses of material, and means for stripping cut pieces of shingle material from said cutting roller.

6. In a shingle making machine wherein a cutting element forms a continuously moving shingle web into shingle pieces, the combination with said cutting element of feed mechanism comprising a taut substantially short-centered endless band means of sufficient width to support and move said shingle web to the cutting element and a circular member in pressing relation to said web supporting band means along a peripheral segment to substantially uniformly grip between them a substantial area of the web, said feed mechanism positively adjustable to simultaneously increase the pressure of and amount of said radial grip to secure a positive feed to the cutter whereby accurately cut shingles may be obtained.

7. In a shingle making machine, a cutting element, a substantially short-centered endless band member for supporting and moving shingle material to the cutting element, a circular member in pressing relation to the band member along a peripheral segment to substantially uniformly grip between them a substantial area of the fed material and means for simultaneously and positively adjusting the relation of the circular member and band member to increase the pressure of and amount of said radial grip to secure a positive feed, said means also adapted to adjust said relation to accommodate different thicknesses of material.

8. In a shingle making machine, a rotatable cutting element, a direct driven substantially short-centered endless band member for supporting and moving shingle material to the cutting element, a roller member in pressing relation to the band member along a peripheral segment by deflection of the band member below its normal plane of motion to substantially uniformly grip between them a substantial area of the fed material and means for positively adjusting said deflection to increase the pressure of and amount of radial grip to secure a positive feed and thereby obtain accurately cut shingles.

NORMAN P. HARSHBERGER.